United States Patent [19]

Masuhara et al.

[11] Patent Number: 4,926,450
[45] Date of Patent: May 15, 1990

[54] FUEL ASSEMBLY

[75] Inventors: Yasuhiro Masuhara, Katsuta; Soamu Yokomizo; Kotaro Inoue, both of Ibaraki; Sadao Uchikawa, Katsuta; Motoo Aoyama, Hitachi; Junichi Yamashita, Hitachi; Yuichiro Yoshimoto, Hitachi; Tetsuo Yasuda, Hitachi; Hiromasa Hirakawa, Hitachi, all of Japan

[73] Assignee: Hitachi, Ltd., Tokyo, Japan

[21] Appl. No.: 171,452

[22] Filed: Mar. 21, 1988

[30] Foreign Application Priority Data

Mar. 20, 1987 [JP] Japan ............................ 62-63886

[51] Int. Cl.$^5$ .............................................. G21C 3/32
[52] U.S. Cl. .................................... 376/444; 376/447
[58] Field of Search ..................... 376/443, 444, 447

[56] References Cited

U.S. PATENT DOCUMENTS

| | | | |
|---|---|---|---|
| 4,597,937 | 7/1986 | Sakurai | 376/441 |
| 4,652,426 | 3/1987 | Boyle | 376/352 |
| 4,686,079 | 8/1987 | Ishikawa | 376/444 |
| 4,777,016 | 10/1988 | Yoshioka | 376/444 |
| 4,789,520 | 12/1988 | Morimoto | 376/419 |

Primary Examiner—Donald P. Walsh
Attorney, Agent, or Firm—Antonelli, Terry, Stout & Kraus

[57] ABSTRACT

A fuel assembly including a plurality of fuel rods and water rods. The fuel rods are arranged with a predetermined pitch and two water rods are disposed adjacent to each other in a diagonal direction of the fuel assembly. More particularly, the fuel rods are arranged in a lattice of nine rows by nine columns and the two water rods are disposed inside a region corresponding to a space sufficient for disposing seven fuel rods at the center of the fuel assembly. Each of the water rods has an outer diameter greater than the pitch of the fuel rods.

3 Claims, 10 Drawing Sheets

FUEL ASSEMBLY

BACKGROUND OF THE INVENTION

The present invention relates to a fuel assembly and, more particularly, to a fuel assembly for a boiling water reactor and of the type wherein water rods are disposed inside a fuel rod group having a grid of nine-by-nine fuel rods.

A conventional fuel assembly to be used in a boiling water reactor consists of many fuel rods disposed in the grid form of eight-by-eight, two water rods arranged between the fuel rods, and a channel box encompassing them. This conventional fuel assembly has its two water rods arranged adjacent to each other in a central portion of a diagonal which joins a pair of opposed corners of the side faces of the fuel assembly. The water rods have an outer diameter slightly larger than that of the fuel rods but smaller than the size of a square of the grid of fuel spacers holding the fuel rods. Hereinafter, this fuel assembly will be called "8×8 fuel assembly". Cooling water flows between the fuel rods 2 inside the channel box and conveys thermal energy generated inside the fuel rods. However, an idea has been proposed that the fuel assembly is changed to 9×9 fuel assembly by reducing the outer diameter of each fuel rod and increasing the number of fuel rods. This 9×9 fuel assembly has its fuel rods and water rods arranged in 9 rows and 9 columns. In the 9×9 fuel assembly, the heat transfer area of each fuel rod coming into contact with the cooling water increases and the thermal load per fuel rod decreases. For these reasons, the freedom of operation of the reactor can be improved, and the nuclear fuel substance can be fully burnt out. However, the perimeter contact with the coolant increases and friction increases, too. Furthermore, response of the thermal flux at the time of change in calorific value inside the fuel rod becomes sharper, a pressure loss due to a two-phase flow increases and stability margin decreases.

In accordance with the prior art technique, an orifice plate is disposed immediately below the fuel assembly in order to increase the stability margin, and there is a method of increasing this stability margin by increasing the resistance at this orifice plate. A decay ratio indicating an index of stability is defined by the ratio of adjacent amplitudes in flow fluidization. If the decay ratio is above 1, the amplitude increases with the passage of time, and the fluidization becomes unstable. If it is less than 1, on the contrary, the amplitude decreases with the passage of time, and the fluidization becomes stable. In other words, the stability margin increases with smaller decay ratios. Therefore, it is believed effective in improving stability to increase the resistance of the orifice plate. However, if the resistance of the orifice plate is increased, the resistance of the core increases as a whole, and the flow rate of the cooling water drops. This means the problem that a pump having a greater capacity must be used in order to secure a large flow rate of cooling water. The conventional examples of this kind are described in Japanese Patent Laid-Open Nos. 13487/1985 and 52897/1982, and they have a structure wherein the pore diameter of the orifices can be changed. Therefore, reliability drops.

As another means for increasing the stability margin, there is a method which reduces the outer diameters of the fuel rods and water rods, reduces the two-phase flow pressure loss by increasing the flow path area of the cooling water and increases the stability margin. In this case, however, the inventory of uranium as the nuclear fuel substance drops because the outer diameter of the fuel rod is decreased, so that the replacement cycle of the fuel assembly becomes shorter, with the result that the fuel cycle cost increases. The fuel cycle cost can be reduced by increasing the water area in the water rod or by increasing the uranium inventory. In other words, the fuel cycle cost increases if the fuel rod is made thin, because the uranium inventory decreases, and fuel economy gets deteriorated as described already. As the inventions which improve the fuel economy in the 9×9 fuel assembly, mention can be made of Japanese Patent Laid-Open Nos. 159185/1986 and 172580/1983. In accordance with these prior art examples, however, there is an inevitable limit to the reduction in diameter of the fuel rod from the viewpoint of stability, so that the uranium inventory decreases and the improvement in economy cannot be much expected.

The technique disclosed in Japanese Patent Laid-Open No. 178387/1984 can improve the fuel economy, but it is not easy to employ because the operation is inside an unstable range.

As described above, various methods described above which increases the stability margin of the 9×9 fuel assembly involve the problems that the stability is improved, the fuel cycle cost increases and if the fuel cycle cost is reduced, on the contrary, the stability gets deteriorated.

SUMMARY OF THE INVENTION

It is therefore an object of the present invention to provide a fuel assembly which can improve stability and at the same time can improve economy, too.

The object of the invention described above can be accomplished by setting the ratio $A_{rod}/A_{CH}$ of the sum $A_{rod}$ of the cross-sectional areas of fuel rods in a fuel assembly to the cross-sectional area $A_{CH}$ of the fuel assembly within such a predetermined range as is determined on the basis of the ratio $A_w/A_{CH}$ of the sum $A_w$ of the cross-sectional areas of water rods in the fuel assembly to the cross-sectional area $A_{CH}$.

More preferably, the object of the invention can be accomplished by setting the ratio $A_{rod}/A_{CH}$ within a range satisfying the following three formulas, if the sum of the cross-sectional area of the water rods in the fuel assembly is designated at $A_w$ (cm$^2$), the cross-sectional area of the fuel assembly is designated by $A_{CH}$ (cm$^2$), and the cladding thickness is designated by $\delta$ (mm):

$(A_{rod}/A_{CH})$
$\leq -1.050(A_w/A_{CH}) + 0.469;$
$(A_{rod}/A_{CH})$
$\leq (0.337\delta + 0.1421)(A_w/A_{CH})$
$+ 0.0804\delta + 0.302;$ and
$(A_{rod}/A_{CH})$
$> (-0.0428\delta - 0.0359) \times (A_w/A_{CH})$
$+ 0.1449\delta + 0.2745.$

DETAILED DESCRIPTION OF THE PREFERRED EMBODIMENTS

Stability includes two stability modes (channel stability and core stability). First, the channel stability is to prevent oscillation of the flow rate distribution of the cooling water and is evaluated for the fuel assembly having the highest output inside the core. Next, the core stability is to prevent any unstable phenomena that occur as the result of coupling of neutron flux inside the core with hydrothermal oscillation. Their respective limit values are expressed by the decay ratio defined in FIG. 1. In other words, the decay ratio is limited to 0.7 or below for the channel stability and to 1.0 or below for the core stability.

Figure 2A:
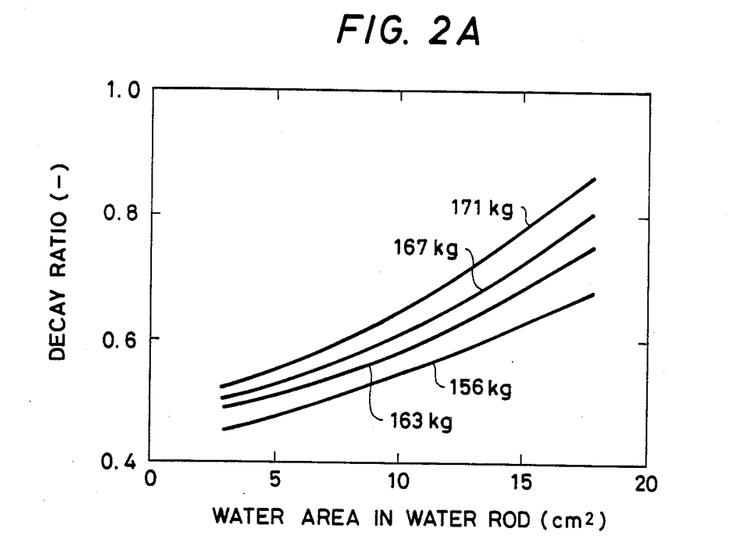
FIG. 2A is an explanatory view showing the characteristics of channel stability with respect to the water area in the water rod.
Figure 2B:
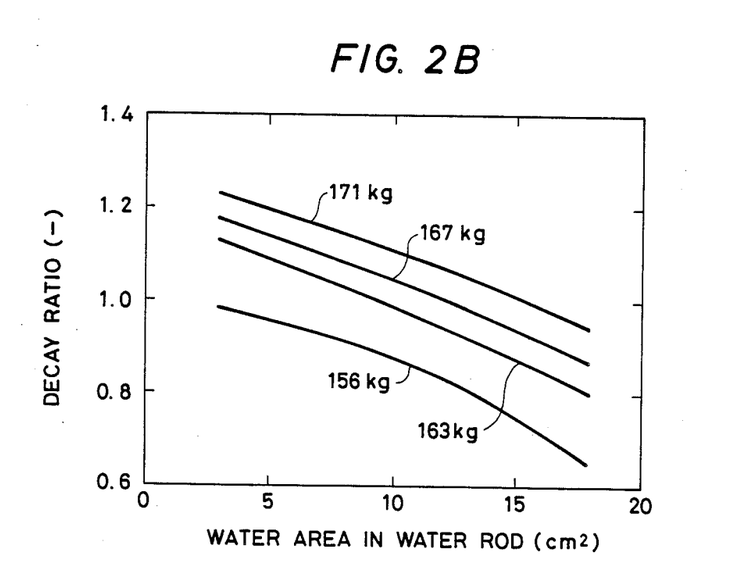
FIG. 2B is an explanatory view showing the characteristics of core stability with respect to the water area in the water rod.
Figure 3A:
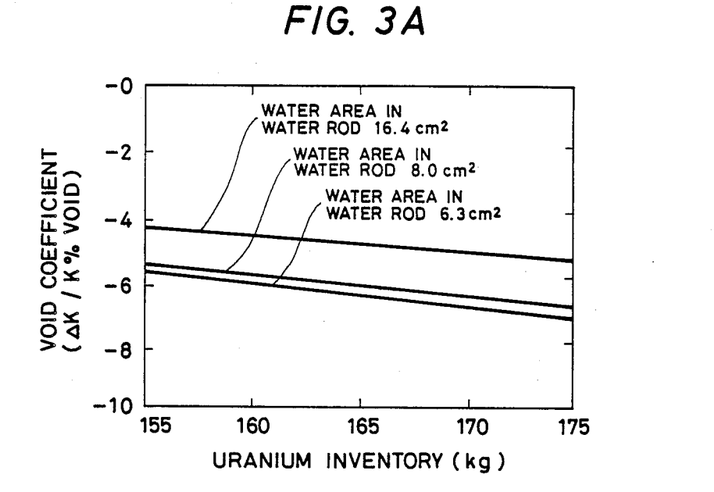
FIG. 3A is an explanatory view of uranium inventory dependence of a void coefficient.
Figure 3B:
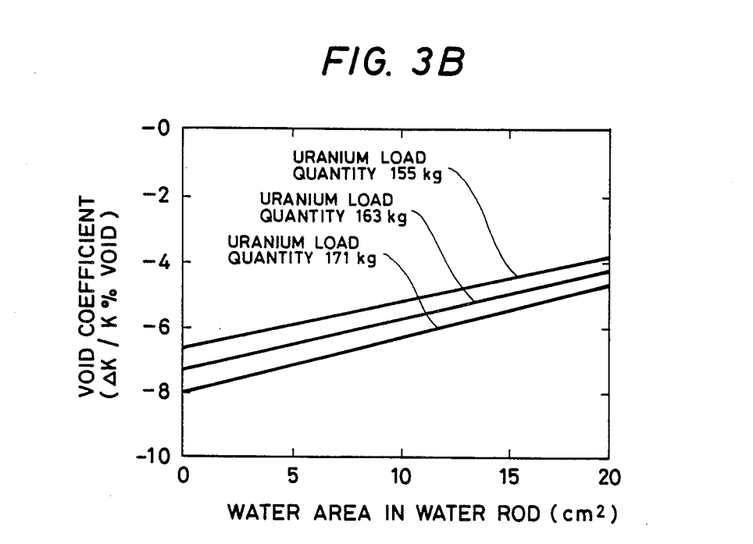
FIG. 3B is an explanatory view showing dependence thereof on a water area in the water rod.

Therefore, we have examined the channel stability and the core stability for the 9×9 fuel assembly, and the result of examination will be given below. First of all, FIG. 2A shows dependence of the decay ratio on the water area in the water rods. The parameter used in FIGS. 2A and 2B is the uranium inventory. FIG. 2A shows the channel stability, and FIG. 2B does the core stability. It has been found out that as to the channel stability, the decay ratio increases with greater water areas inside the water rods and with greater uranium inventories and stability margin decrease, for the following reasons. Namely, if the water area in the water rod and the uranium inventory increase, the flow area inside the fuel assembly decreases, the pressure loss in the fuel assembly increases, and the channel stability decreases. As to the core stability, on the other hand, it has been found that the decay ratio increases with increasing uranium inventories but it decreases if the water area inside the water rod is increased, on the contrary. This is because the void coefficient exhibits opposite characteristics between the uranium inventory and the water area inside the water rod, as shown in FIGS. 3A and 3B. Namely, if the uranium inventory increases, the absolute value of the void coefficient increases so that the change in the neutron flux with respect to the change in the void ratio increases, and the core stability decreases. If the water area inside the water rod increases, on the other hand, the proportion of the area of the moderator, which does not change with the void ratio, increases to that the void coefficient approaches to zero (0) and the core stability can be improved.

Next, these two kinds of stability are examined on the basis of the water area inside the water rod and the uranium inventory. The result of examination is shown on the map of the water area inside the water rod-vs-uranium inventory of FIG. 4. A limit region (the region on the right side from curve A) resulting from the channel instability exists on the upper right side of FIG. 4 (the region where the water area inside the water rod is great and the uranium inventory is great), while a limit region (the region on the left from curve B) resulting from the core instability exists on the upper left side of FIG. 4 (the region where the water area inside the water rod is small and the uranium inventory is great). The allowable range for stability exists at the center of FIG. 4 and describes the shape of a mountain encompassed by the curves A and B. The contour line of the fuel cycle cost is represented by dash lines in FIG. 4. The fuel cycle cost decreases toward the upper right portion in FIG. 4. Therefore, it has been found that the most suitable portion, where the fuel cycle cost is the lowest, is near the point of intersection between the characteristics A and B (the top of the mountain), inside the allowable range of stability shown in FIG. 4. In other words, the fuel assembly near this top portion (near 13 $cm^2$ in terms of the flow path area inside the water rod) is the best. Incidentally, the fuel cycle cost used here is based on the later-described embodiment shown in FIG. 10.

Figure 5:
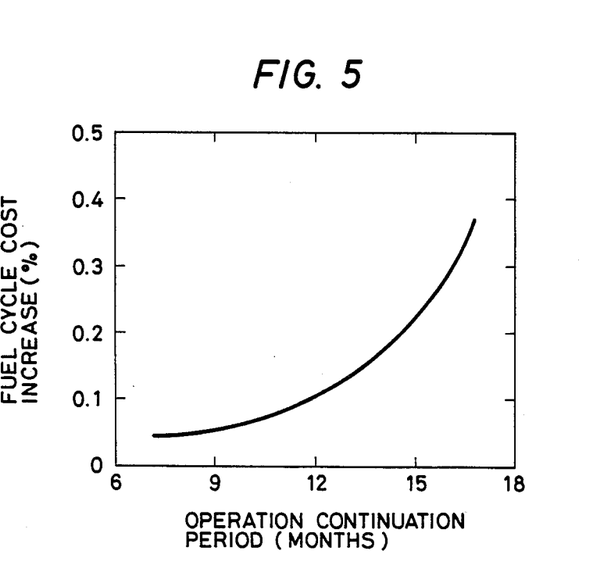
FIG. 5 is a diagram showing the difference of a fuel cycle cost between a 9×9 fuel assembly and an 8×8 fuel assembly.

Besides the 9×9 fuel assembly, the fuel cycle cost can be reduced by a method which improves enrichment of the fuel in the 8×8 fuel assembly and improves combustibility. This method is analyzed and compared with the fuel cycle cost of the embodiment shown in FIG. 10. The result is shown in FIG. 5. The ordinate in FIG. 5 represents the rise value of the fuel cycle cost from the 8×8 fuel assembly to the 9×9 fuel assembly. The abscissa represents the operation continuation period. It can be understood that the 9×9 fuel assembly becomes better with a longer operation continuation period. However, the difference is about 0.1% in the operation continuation period of 12 months. In other words, the 9×9 fuel assembly whose fuel cycle cost is about 0.1% in FIG. 5 exhibits lower performance than the 8×8 fuel assembly. It is therefore expected that the merit of the 9×9 type will be lost.

Figure 4:
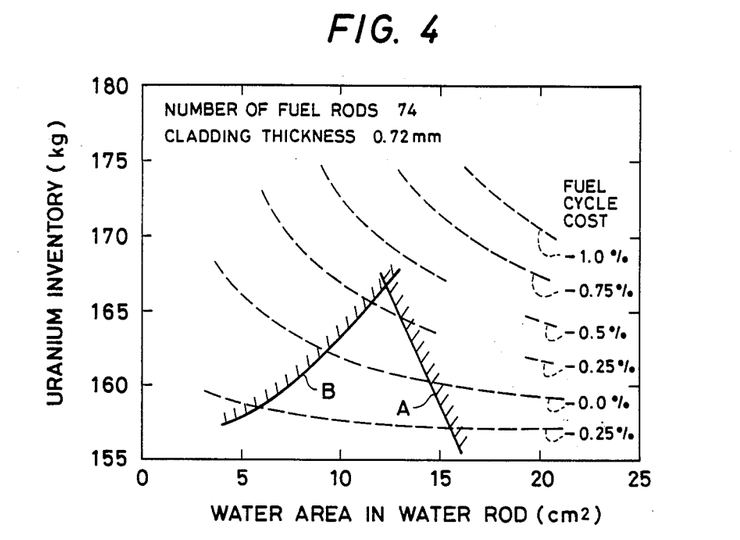
FIG. 4 is a diagram showing a map of the uranium inventory-dependence on a water area in the water rod and the stability limit.
Figure 6A:
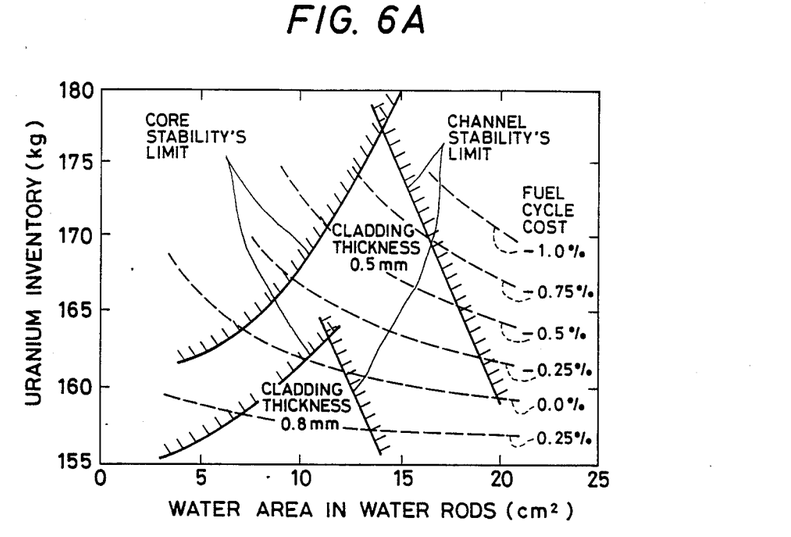
FIG. 6A is an explanatory view showing the relationship between the water area in the water rod and the uranium inventory that correspond to the cladding thickness.
Figure 6B:
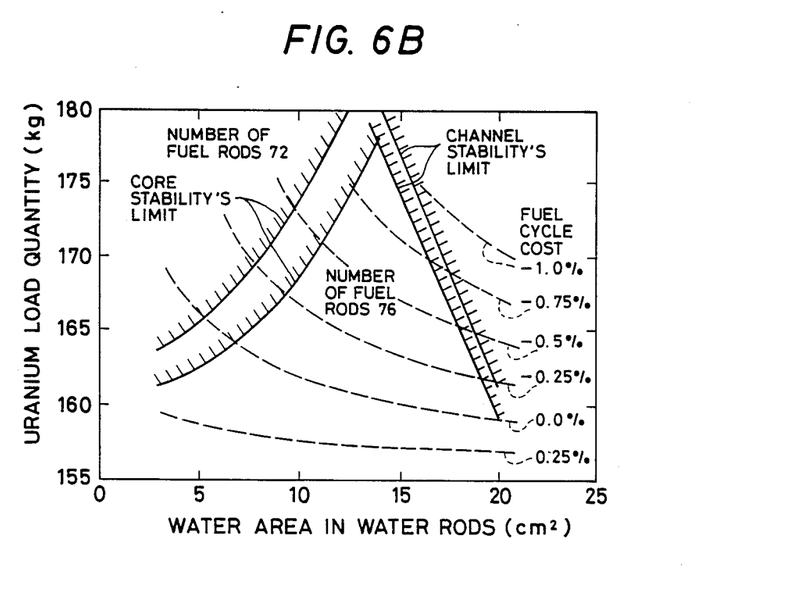
FIG. 6B is an explanatory view showing the relationship between the water area in the water rod and the uranium inventory that correspond to the number of fuel rods.

Incidentally, the conditions of analysis in FIG. 4 are the number of fuel rods of 74 and the cladding thickness of the fuel rods of 0.72 mm. It is believed, however, that the limit region will move if the number of fuel rods and the cladding thickness vary, because the flow area inside the fuel assembly changes. Therefore, the limit region is further examined by changing the cladding thickness and the number of fuel rods. FIG. 6A shows the result of examination when the cladding thickness is 0.5 mm and 0.8 mm, while FIG. 6B shows the result of examination when the number of fuel rods is 72 and 76. The limit regions move in both FIGS. 6A and 6B, but the moving distance of the limit region is greater when the cladding thickness is changed than when the number of fuel rods is changed. When the cladding thickness changes from 0.5 mm to 0.8 mm, the boundary of the limit region moves, and the uranium inventory can be increased by about 10 kg. Furthermore, when the moving distance of the limit region due to the channel instability is compared with that of the limit region due to the core instability, the moving distance of the limit region due to the channel stability becomes greater when the cladding thickness is changed, and the moving distance of the limit region due to the core instability becomes greater when the number of fuel rods is changed. In this manner, the limit region with instability exhibits the complicated changes depending on the cladding thickness and the number of fuel rods. Therefore, it becomes extremely troublesome to examine the optimal shape by changing the cladding thickness and the number of fuel rods. For this reason, a set condition which can take into consideration the changes in the cladding thickness and the number of fuel rods is examined. Its content will be explained next.

Figure 7A:
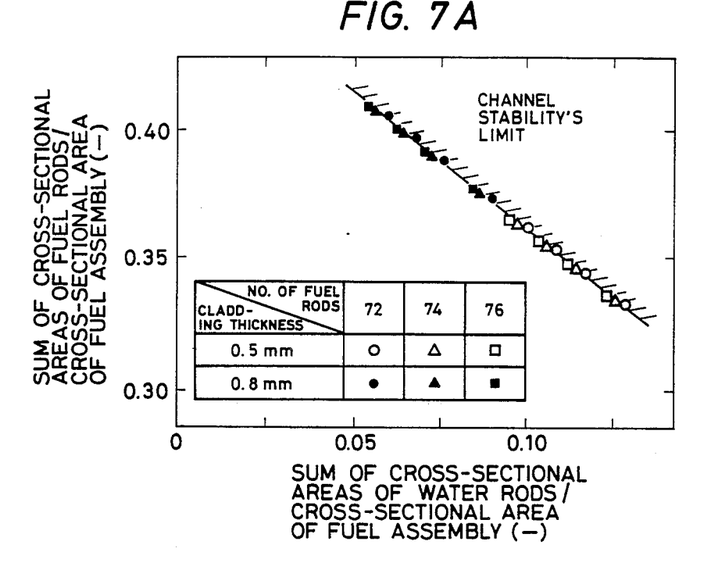
FIG. 7A is an explanatory view showing the relationship between the boundary line of stability and a fit formula with respect to channel stability.

The data of the stability boundary for the channel stability and the core stability are summarized as to the sum of the cross-sectional areas of the fuel rods inside the fuel assembly (inclusive of the cross-sectional area of the cladding tube) and as to the sum of the cross-sectional areas of the water rods inside the fuel assembly (inclusive of the sectional area of the tube of the water rod). FIG. 7A shows the result of examination of the channel stability, and FIG. 7B does that of the core stability. If the data are put in order in this manner, the data on the stability boundary line exist on the line irrespective of the cladding thickness and the number of fuel rods as to the channel stability of FIG. 7A, and the region above this line becomes the limit region where the channel instability occurs. As to the core stability shown in FIG. 7B, on the other hand, the data on the stability boundary line depend on the cladding thickness but hardly depend on the number of fuel rods and exist in dots on the line. The reason is as follows. As to the channel stability, if the cooling water flow area inside the fuel assembly is the same, substantially the same decay ratio is exhibited so that the stability boundary becomes the data on substantially the same flow path area. Incidentally, the flow path area is the balance obtained by substracting the sum of the cross-sectional areas of the fuel rods and the sum of the cross-sectional areas of the water rods from the cross-sectional area of the fuel assembly. Therefore, the data on the stability boundary can be expressed by the linear function of the sum of the cross-sectional areas of the fuel rods and the sum of the cross-sectional areas of the water rods and exist in dots on the line. On the other hand, the core stability depends on the void coefficient and the flow path area of the cooling water inside the fuel assembly. This flow area of the cooling water is determined definitely by the sum of the cross-sectional areas of the fuel rods and the sum of the cross-sectional areas of the water rods, but the void coefficient changes in accordance with the uranium inventory, too. Therefore, if the cladding thickness changes, the void coefficient changes so that the boundary of stability moves.

Figure 7B:
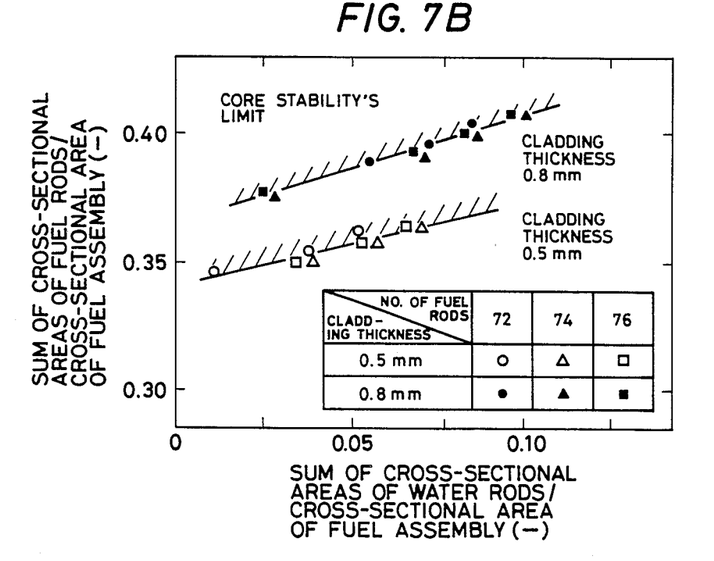
FIG. 7B is an explanatory view showing the relationship between the boundary line of stability and a fit formula with respect to core stability.

As can be seen clearly from FIGS. 7A and 7B, the boundary data of both kinds of stability exist in dots on the line. Therefore, a fit formula capable of easily evaluating the stability boundary can be prepared. If this fit formula is employed, the allowable range of stability can be described in the following way.

Allowable range for the channel stability:

$$(A_{rod}/A_{CH}) \leq -1.050 (A_w/A_{CH}) + 0.469 \qquad (1);$$

and
Allowable range for the core stability:

$$(A_{rod}/A_{CH}) \qquad (2)$$
$$\leq (0.337\delta + 0.1421)(A_w/A_{CH})$$
$$+ 0.0804\delta + 0.302,$$

where
$A_w$: Sum of cross-sectional areas of water rods in fuel assembly (cm$^2$);
$A_{rod}$: Sum of cross-sectional areas of fuel rods in fuel assembly (cm$^2$);
$A_{CH}$: Sectional area of fuel assembly (cm$^2$); and
$\delta$: Cladding thickness (mm).

However, the sectional area of the fuel assembly is the cross-sectional area inside the channel box.

As described already, when the fuel cycle cost of the 8×8 fuel assembly (high enrichment) is calculated, the fuel cycle cost decreases by about 0.1% with respect to the standard value. Therefore, if the fuel cycle cost of the 9×9 fuel assembly exceeds the value of this 8×8 fuel assembly, the merit of use of the 9×9 fuel assembly is lost. Therefore, the limit value that the fuel cycle cost is smaller than the value of the 8×8 fuel assembly is added. When this limit value is put in order in the same way as above, the following relational formula can be obtained:

$$(A_{rod}/A_{CH}) \qquad (3)$$
$$> (-0.0428\delta - 0.0359) \times (A_w/A_{CH})$$
$$+ 0.1449\delta + 0.2745.$$

The allowable range is clarified by the use of the set conditions of the formulas (1) to (3) described above about the case where the inner which of the channel box is 132.4 mm (the cross-sectional area of the fuel assembly is 174.7 cm$^2$) and the thickness of the cladding tube of the fuel rod is 0.72 mm by way of example. Its result is shown in FIG. 8.

Figure 8:
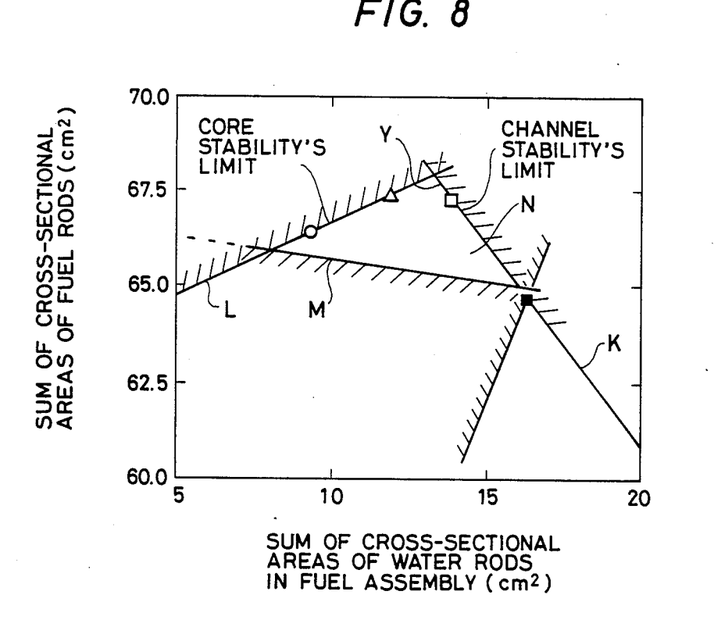
FIG. 8 is an explanatory view showing an allowable range in association with the sum of water rod cross-sectional areas and the sum of cross-sectional areas of fuel rods.

In FIG. 8, line K represents the limit of the channel stability and the channel instability occurs above the line K. The region below the line K inclusive of the line K is the region of the formula (1). Line L represents the limit of the core stability and the core instability occurs above the line L. The region below the line K inclusive of the line K is the region of the formula (2). Line M relates to the fuel cycle cost and the region above the line M is one that satisfies the formula (3). The allowable region falls inside the triangular region defined by the lines K, L and M, that is, the triangular region N, and it can be understood that the fuel cycle cost reaches the minimum at the top Y of this triangular region N and that this is the optimum region. Furthermore, the condition for this optimum region should satisfy the above-mentioned formulas (1) and (2) as well as the following formulas (4) and (5):

$$0.98 \times (0.0804\delta - 0.1672)/(-0.337\delta + 1.192) \qquad (4)$$

-continued $$\leq (A_w/A_{CH})$$
$$\leq 1.02 \times (0.0804\delta = -.1672)/(-0.337\delta + 1.192);$$
and
$$0.98 \times (-0.2422\delta + 0.735)/(-0.337\delta + 1.192) \quad (5)$$
$$\leq (A_{rod}/A_{CH})$$
$$\leq 1.02 \times (-0.2422\delta + 0.735)/(-0.337\delta + 1.192).$$

Figure 1:
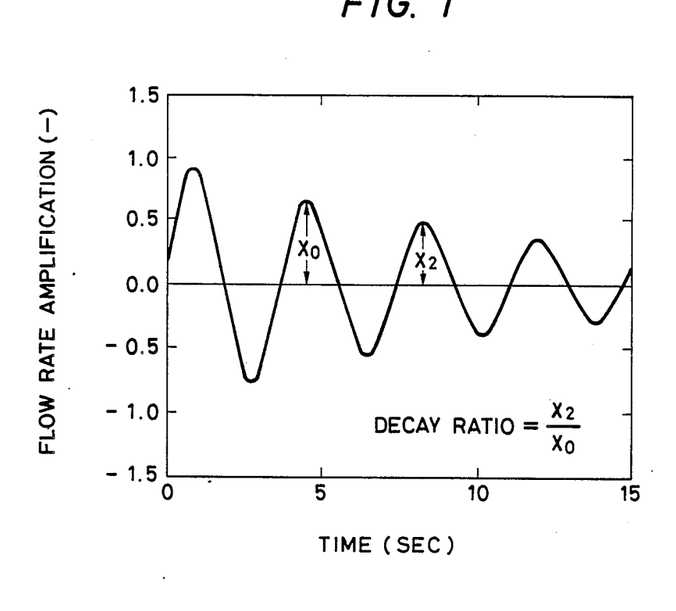
FIG. 1 is an explanatory view of a decay ratio as a parameter of stability.

In the drawings, symbols o, Δ and □ represent the later-described embodiments shown in FIGS. 1, 15 and 20, respectively, while symbol ● represents the fuel assembly shown in FIGS. 1 and 2 of Japanese Patent Laid-Open No. 178387/1984. In the later-described embodiments shown in FIGS. 1, 15 and 20, it will be understood that the allowable range is positioned inside this triangular region N and that the fuel economy is high. On the other hand, the prior art example of the symbol ● is outside this triangular region N when calculation is made on the basis of the disclosure of Japanese Patent Laid-Open No. 178387/1984 (outer diameter of fuel rod: 10.75 mm, diameter of water rod: 13.7 mm), and cannot therefore be used already.

According to the studies described above, the fuel cycle cost can be reduced if any of the set conditions of the formulas (1) to (3) is satisfied, and the fuel economy can be improved drastically. In the ranges of the formulas (4) and (5), in particularly, the fuel cycle cost reaches the minimum while satisfying each stability.

Hereinafter, preferred embodiments of the present invention obtained on the basis of the examination results will be described with reference to the drawings.

Figure 9:
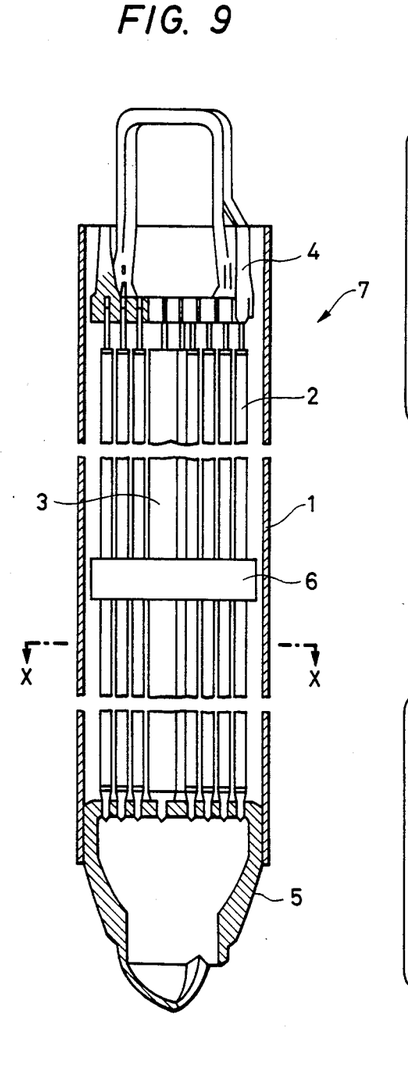
FIG. 9 is a longitudinal section showing a fuel assembly according to one preferred embodiment of the present invention.
Figure 10:
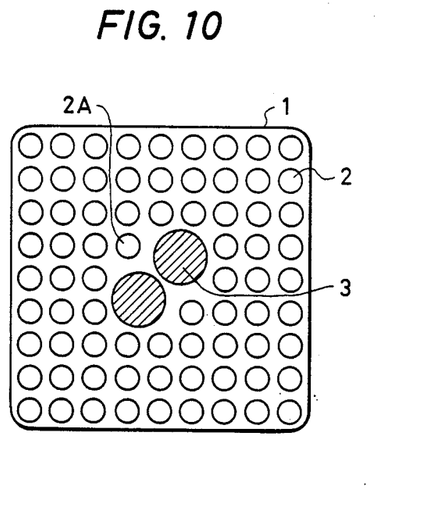
FIG. 10 is a section along line X—X of FIG. 9.

FIGS. 9 and 10 show the fuel assembly in one embodiment of the present invention. A fuel assembly 7 of this embodiment includes 74 fuel rods 2, an upper tie plate 4, a lower tie plate 5, a fuel spacer 6, water rods 3, and a channel box 1.

The upper tie plate 4 and the lower tie plate 5 hold the upper and lower end portions of the fuel rods 2. The 74 fuel rods 2 are arranged in the form of 9 rows by 9 columns, and the adjacent ones have their inter-spacings held by the fuel spacer 6. The channel box 1 is a tube having a substantially square cross-section, which is tied to the upper tie plate 4 to encompass the fuel rods bundled by the fuel spacer 6. The two water rods 3 are arranged at the center of the cross-section of the fuel assembly 7. These two water rods 3 are arranged at the center of the diagonal, which joins a pair of opposed corners of the fuel assembly 7, i.e., the channel box 1, and which are adjacent to each other. The inner width of the channel box 1 is 132.4 mm (the cross-sectional area of the fuel assembly = 174.7 cm$^2$). The two water rods 3 having a round section are disposed at the portion of the 3-row 3-column at the center of this fuel assembly, and the two fuel rods 2A are disposed at the vacant positions. Furthermore, the sum $A_w$ of the cross-sectional areas of the water rods and the sum of the cross-sectional areas of the fuel rods 2 are set so as to satisfy the set conditions of the formulas (1) to (3) in association with the thickness δ of the cladding tube of the fuel rods 2. The values of 174.7 cm$^2$ and 0.722 mm shown in FIG. 8 are used as the values $A_w$ and δ, respectively. The outer diameter of the water rod 3 having a round sectional shape is greater than the pitch of the fuel rods 2. However, there is an upper limit value to the size of the water rod 3 because the fuel rods 2 are disposed around the water rod 3. The sum $A_w$ of the cross-sectional areas of the two water rods 3 is determined as 9.16 cm$^2$ from this upper limit value. The corresponding point of this embodiment is represented by the symbol o in FIG. 8. It can be understood that this embodiment lies inside the allowable region N and that the channel- and core-stability as well as the fuel economy are all improved. Since each stability is improved, apparatus or equipment disposed for improving the stability become necessary. Back-fit can be made to existing boiling water reactors, too. Furthermore, the fuel cycle cost can be reduced remarkably, and the fuel economy can be improved in the existing boiling water reactors by employing the fuel assembly of the present invention because the fuel rods can be increased from the 8×8 grid to the 9×9 grid and by the effect of this embodiment. Since the water rod 3 used in this embodiment is round as described above, its producibility and reliability are high. When the 3×3 grid portion at the center of the fuel assembly of this embodiment is considered in particular, the two fuel rods 2A can be disposed in the proximity of the water rod 3 at this portion, though the thickness of the water rod 3 is increased. Accordingly, the space utilization inside the fuel assembly 7 can be improved. In other words, since the number of the fuel rods 2 inside the fuel assembly 7 increases, the thermal load per unit fuel rod 2 decreases so that the operation freedom of the reactor increases, and the reactor can be operated in such a manner as to burn out efficiently nuclear fission products, thereby improving the fuel economy.

Even when the values of $A_{CH}$ and δ in the aforementioned formulas (1) to (3) other than the values described already are used, the corresponding region N can be determined by the formulas (1) to (3).

Figure 11:
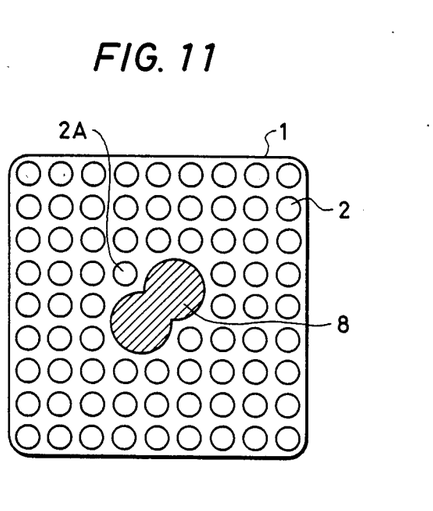
FIGS. 11 to 18 are cross-sectional views showing fuel assemblies according to other embodiments of the present invention.
Figure 12:
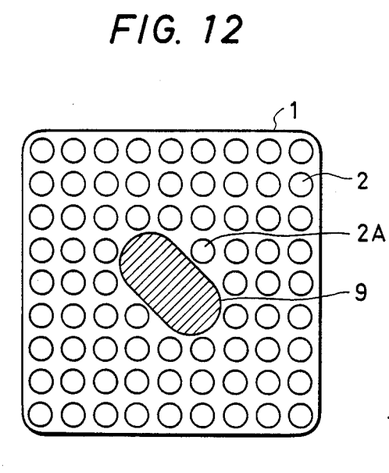
Figure 13:
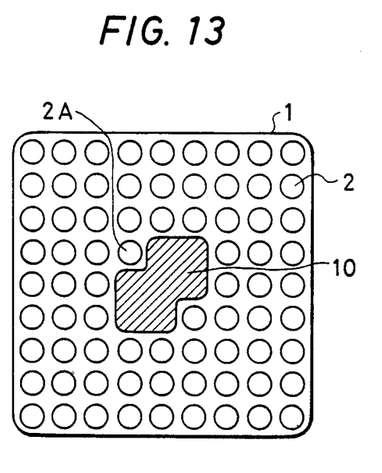

FIGS. 1, 2 and 3 show fuel assemblies of other embodiments of the present invention, respectively. In these embodiments, the total number of the fuel rods 2 is 74 in the same way as in the embodiment shown in FIG. 9, and a water rod 8 having a gourd-shaped cross-section (FIG. 11), a water rod 9 having an oval cross-section (FIG. 12), and a water rod 10 having a double-square cross-section (FIG. 13) are disposed at the center of the fuel assemblies, respectively. The size of the channel box 1, the outer diameter of each fuel rod and this cladding thickness are the same as those of the channel box 1 and the fuel rod 2 used in the embodiment shown in FIG. 9. This also holds true of the later-described embodiments shown in FIGS. 14 to 18. According to these structures, the sum of the cross-sectional areas of the water rods increases, and the upper limit values are 12.01 cm$^2$ (FIG. 11), 10.9 cm$^2$ (FIG. 12) and 13.99 cm$^2$ (FIG. 13), respectively. In comparison with the embodiment shown in FIG. 9, it becomes possible to bring the values each closer to the optimum point shown in FIG. 8, and the fuel cycle cost can be reduced drastically. Symbol Δ in FIG. 8 represents the value of the embodiment shown in FIG. 11. Since two extra fuel rods 2A can be disposed near the water rod in the same way as in the embodiment shown in FIG. 9, though the water rod is made thicker, the space utilization can be improved, and the thermal load per unit fuel rod can be lowered so that the operation freedom can be improved and the fuel can be burnt out efficiently.

Figure 14:
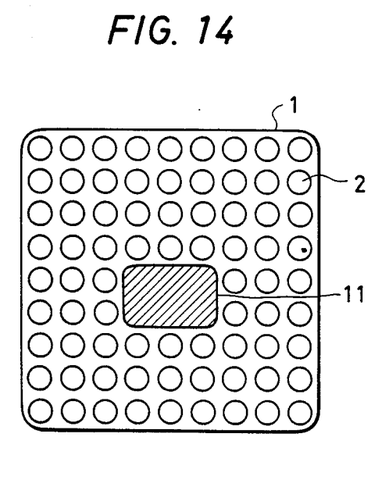
Figure 15:
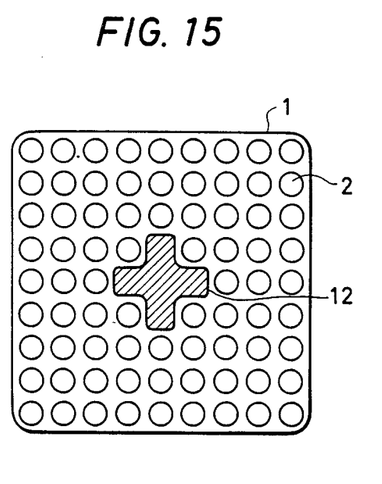

FIGS. 14 and 15 show other embodiments of the present invention. In the embodiment shown in FIG. 14, a water rod 11 having a rectangular cross-section is disposed at the center of the fuel assembly, and the total number of fuel rods is 75. In the embodiment shown in FIG. 19, a water rod 12 having a crisscross-section is disposed at the center of the cross-section of the fuel assembly, and 76 fuel rods 2 are disposed around it. In these structures, the sum of the cross-sectional areas is 11.4 cm² for the fuel assembly of FIG. 14 and 8.3 cm² for the fuel assembly of FIG. 15, and the fuel cycle cost can be reduced to substantially the same level as that of the embodiment shown in FIG. 9. Since the total number of the fuel rods increases in these embodiments, the thermal load per unit fuel rod decreases and the operation freedom of the reactor increases. Accordingly, the fissionable materials can be burnt out efficiently by utilizing the increase in this freedom and economy can be further improved.

Figure 16:
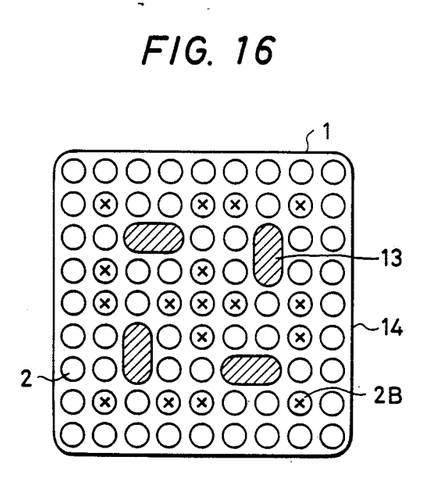

FIG. 16 shows the fuel assembly in still another embodiment of the present invention. In this embodiment, the total number of fuel rods 2 is 73, and four water rods 13 which have an oval cross-sectional shape and occupy the space of two fuel rods are arranged on the side of the square positioned on the third layer from the position of the fuel rods 2 on the outermost layer inside the fuel assembly. Furthermore, one of the minor sides of each water rod 13 is disposed at the corner of the square described above. Accordingly, the sum of the cross-sectional areas of the four water rods 13 in this embodiment corresponds substantially to the sum of the cross-sectional areas of eight fuel rods and becomes extremely great. In the case of a fuel assembly having an inner width of 134.6 mm for the channel box 1, for example, the pitch of the fuel rods 2 is 14.6 mm. Though the size of the water rod 13 is limited by structural numbers such as a spacer for holding the gap between the fuel rods 2, it is possible to increase the minor size of the water rod 13 up to 13.7 mm and its major side up to 28.3 mm. If these sizes are used to calculate the sum of the cross-sectional areas of the water rods inside the fuel assembly, the result is 13.9 cm². The sum can be positioned substantially at the top Y of the triangular region N as represented by the symbol □ in FIG. 8. Therefore, this embodiment can further improve the fuel economy. Furthermore, this embodiment provides another effect. Namely, a large number of fuel rods 2 face the water rod 13 in this embodiment. The number of those fuel rods 2B which are not in contact with the water rods 13 and with the by-pass region 14 (the water gaps defined between the adjacent fuel assemblies when they are loaded into the core) is 17. The rest of 56 fuel rods 2 are in contact with the water rod 13 or with the by-pass region 14. It is known that generally the fuel economy can be improved by burning a fuel having high enrichment at portions where the water quantity is great (Japanese Patent Laid-Open No. 26292/1983). Therefore, since the number of fuel rods which are in contact with the water rod 13 or with the by-pass region 14 is great in this embodiment, a large number of fuel rods having high enrichment can be disposed so that the fuel economy can be improved remarkably. Since the disposition of the water rods 13 is made relatively uniform, the neutron flux distribution and calorific distribution inside the fuel assembly can be made uniform. As a result, the thermal margin increases, and the freedom of the reactor operation can be further improved.

Figure 17:
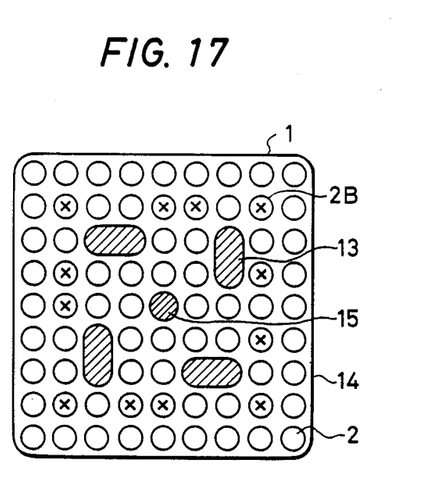
Figure 18:
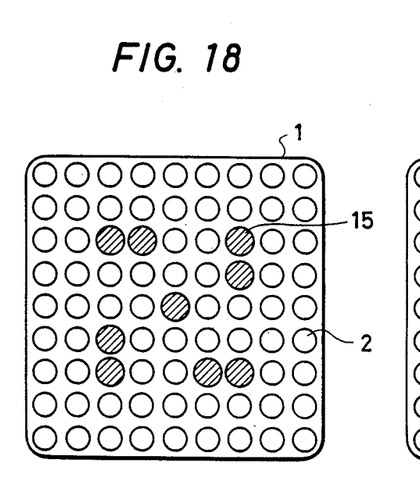

FIGS. 17 and 18 show modified embodiments of the embodiments shown in FIG. 16. In the embodiment shown in FIG. 17, one more water rod represented by reference numeral 15 is added to the center of the fuel assembly of the embodiment shown in FIG. 16. The number of fuel rods 2B which are out of contact from the water rods 13 and 15 and the by-pass region 14 decreases to 12. Therefore, a greater number of fuel rods having high enrichment can be disposed so that the fuel economy can be further improved. On the other hand, in FIG. 18, nine water rods 15 having a round sectional shape (which may be square) are disposed at the positions of the water rods 13 and 15 in the embodiment shown in FIG. 17. The sum of the cross-sectional areas of the nine water rods 15 can be at most 13.3 cm² so that the position near the top Y of the region N in FIG. 8 can be taken. Furthermore, this embodiment provides another effect that since the water rod is cylindrical, it has high producibility and high reliability.

As shown in FIGS. 6A and 6B, the channel stability and core stability depend greatly on the cladding thickness. In other words, if the cladding thickness is reduced to about 0.5 mm, the stability allowable range expands remarkably, and the fuel cycle cost decreases by about 1%. It is thus expected that the fuel economy can be improved remarkably. The thickness of the fuel rod can be reduced by the use of a metal having high corrosion resistance and high neutron economy so that the fuel cycle cost can be further reduced and the fuel economy can be improved remarkably.

Figure 19:
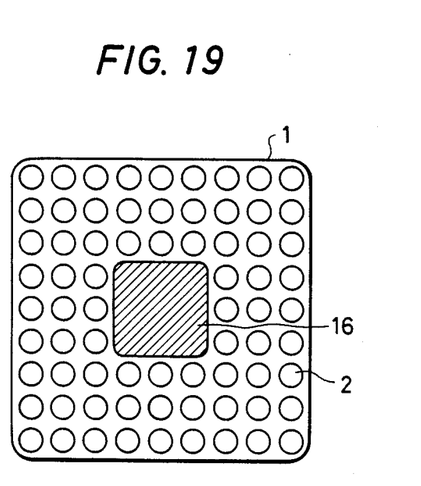
FIG. 19 is a cross-sectional view showing another fuel assembly to be used in a boiling water reactor.

The conditions of the formulas (1) to (3) are examined for the fuel assembly shown in FIG. 19. One water rod 16 having a cross-sectional shape in the positive direction is disposed on the cross-sectional plane into which nine fuel rods at the center of the fuel assembly is disposed. Seventy-two fuel rods 2 are disposed. In accordance with this structure, the sum of the cross-sectional area of the water rod 16 can be further increased, and the upper limit of the water rod flow path area is 16.8 cm². For this reason, there is the possibility that the total sectional area of the water rod 16 can be set to the position (13 cm²) of the top Y of the region N shown in FIG. 8 by reducing the thickness of the water rod 16. However, in the plan using 72 fuel rods, a great gap is defined close to the water rod 16 at the center of the fuel assembly since the water rod 16 is made thin, and the cooling water by-passes and flows through this gap. Accordingly, the flow rate of the cooling water drops substantially from around the fuel rod 2, and the margin for the critical output of the fuel rod 2 drops, so that the limit region of the critical output occurs such as shown in FIG. 8 and the water rod 16 can be made thin only to the extent represented by symbol ■ (FIG. 8). As a result, this embodiment is out of the region N shown in FIG. 8, and the fuel economy becomes lower than that of the 8×8 fuel assembly.

In the emboidments shown in FIGS. 17 and 18, the water rod is disposed in the region corresponding to nine fuel rods in the same way as in the fuel assembly shown in FIG. 18, but in the embodiments shown in FIGS. 17 and 18, the water rods are distributed inside the fuel assembly so that the margin with respect to the critical output of the fuel rod does not decrease unlike the fuel assembly shown in FIG. 19 and the embodiments are contained inside the region N.

Since the present invention can increase the margin of stability of the fuel assembly, the uranium inventory can be increased by the quantity corresponding to the increment. Accordingly, the fuel cycle cost can be reduced drastically, and high fuel economy can be accomplished.

What is claimed is:

1. A fuel assembly comprising a plurality of fuel rods and water rods, the fuel rods being disposed with a predetermined pitch, and two water rods each having an outer diameter greater than the pitch of the fuel rods being disposed adjacent to each other in a diagonal direction of the fuel assembly inside a region of the fuel assembly corresponding to a space sufficient for disposing seven fuel rods at the center of the fuel assembly.

2. A fuel assembly comprising a plurality of fuel rods arranged with a predetermined pitch in a lattice and a plurality of circular water rods, two water rods being disposed adjacent to each other in a diagonal direction of the fuel assembly, each of the two water rods having an outer diameter greater than the pitch of the fuel rods, and a distance between outer surfaces of the two water rods facing each other being smaller than an outer diameter of the fuel rods.

3. A fuel assembly comprising a plurality of fuel rods arranged in a lattice of nine rows by nine columns and a plurality of water rods, two water being disposed adjacent to each other in a diagonal direction of the fuel assembly inside a region corresponding to a space sufficient for disposing seven fuel rods at the center of the fuel assembly.

* * * * *